REMOTE REPEATER DISTORTION CONTROL BY SWITCHING
Filed Dec. 21, 1964
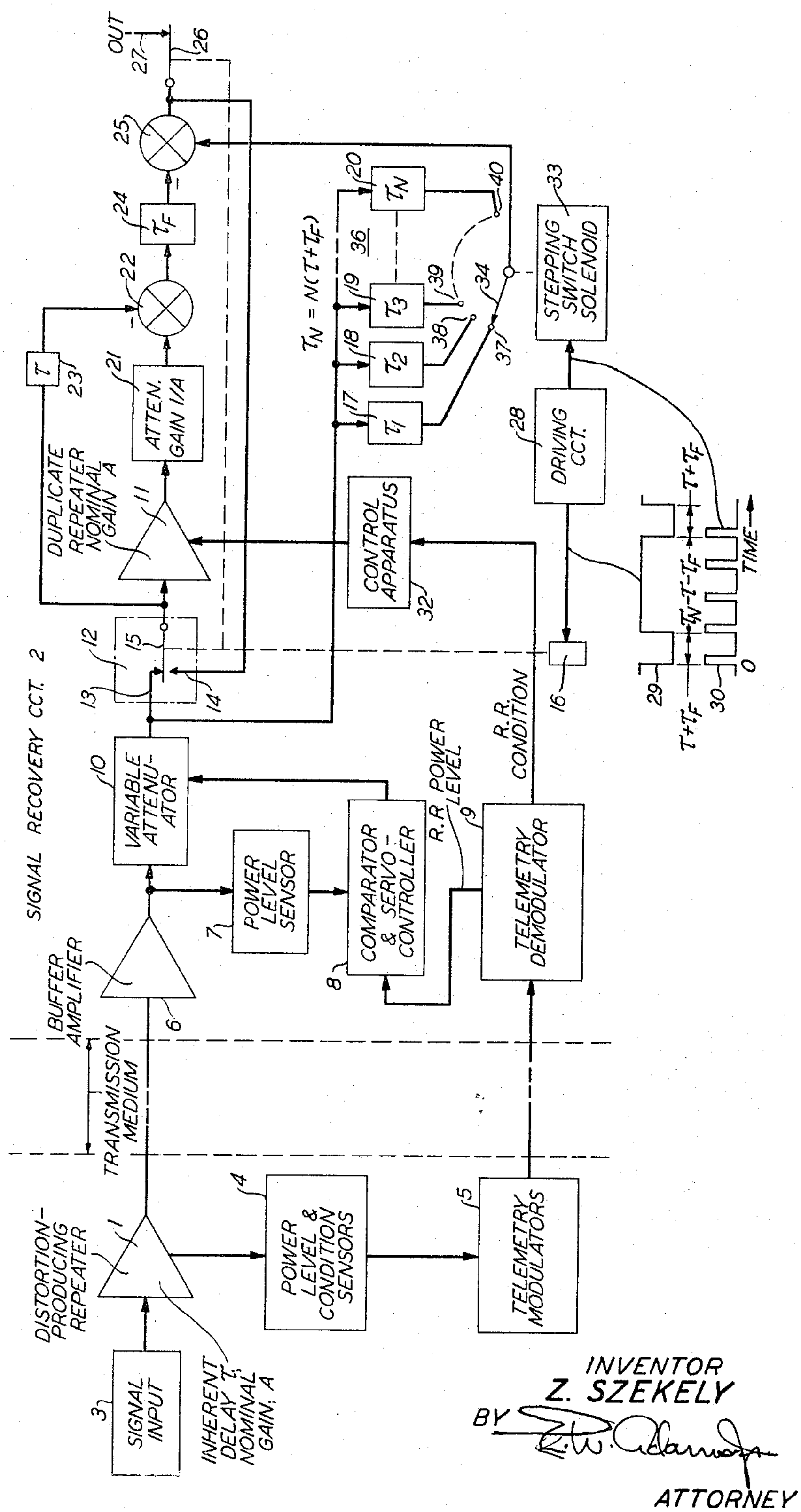
INVENTOR
Z. SZEKELY
BY [signature]
ATTORNEY United States Patent Office 3,331,027

Patented July 11, 1967

3,331,027

REMOTE REPEATER DISTORTION CONTROL BY SWITCHING

Zoltán Székely, Summit, N.J., assignor to Bell Telephone Laboratories, Incorporated, New York, N.Y., a corporation of New York Filed Dec. 21, 1964, Ser. No. 420,047
6 Claims. (Cl. 328—164)

ABSTRACT OF THE DISCLOSURE

Iteration is employed at a receiving station to reduce distortion in a signal from a remotely located distortion-producing network by applying the received signal in samples to a network simulating the distorting characteristic of the remotely located network. In the time space between samples, a succession of feedback signals responsive to the last sample is applied to the simulating network by switching. The succession of feedback signals is produced by delaying the received signal for a plurality of different durations in a like plurality of different paths and then, in succession, combining the signal from each of the paths with the signal most recently derived from the simulating network and the signal that was applied to the simulating network to produce the most recently derived signal, all in proportions and senses to remove the newly produced first-order distortion and the next-to-highest order distortion present in the signal derived from the simulating network.

This invention relates to the reduction of distortion in signal transmission and translation systems.

In the copending application of I. W. Sandberg, Ser. No. 308,722, filed Sept. 13, 1963, and assigned to the assignee hereof, it is taught that a nonlinearly distorted signal can be subjected to an iterative process in which the effect of the nonlinear distortion is progressively reduced. In addition, any frequency dependent distortion is also removed.

One problem of such an iterative distortion-reducing system is that a duplicate of the distorting network has to be placed in each stage. Consequently, the system may become prohibitively expensive. Also, inevitable small differences between the characteristics of the different duplicate networks and the original distorting network may make it impossible to reduce the distortion beyond the minimum that can be achieved with only two of three stages of the iterative process. Additional stages of iteration are therefore useless.

This problem of diminishing returns and rising costs is recognized in part in the above-cited copending application; and it is suggested in passing that "Indeed, in some cases it may be more desirable to provide a storage medium for the output of the first stage and conduct all processing in the same single stage of circuitry, but at successive times."

Inasmuch as simple switching techniques are not satisfactory, the present invention is directed to the implementation of the above-mentioned single-stage processing proposal. Applicant has recognized that the successive iterations must be provided by switching in which the synchronization of switches is unlike that of the typical time division switching process because three distinct regimes of operation are required: introduction of a signal sample, reiteration that may be many times longer than the sample, and ultimate removal of the processed signal sample having reduced distortion. Each sample must be kept from mingling with prior or subsequent samples, although it is desirable to minimize the time lapse between the introduction of successive signal samples, thereby helping to minimize sampling distortion.

Moreover, applicant has recognized that time-sharing of a single duplicate network accentuates small differences in characteristics between the original distorting network and the one duplicate network and may be self-defeating in the reduction of distortion.

Accordingly, an object of this invention is to reduce ditsortion of a communication signal iteratively by a simple and effective time-division switching arrangement.

Another object of this invention is to reduce distortion of a communication signal iteratively by sampling techniques with a relatively small amount of sampling distortion.

Still another object of this invention is to reduce distortion present in a signal received from a remotely located distortion producing network by iteration involving a duplicate of the remotely located network and time-division switching techniques, while simultaneously minimizing the effect of differences in the distortion producing capabilities of the remotely located network and the duplicate network.

According to the invention, an iterative system for reducing distortion in signals received from a distortion producing network utilizes time-division switching techniques and a network simulating the distortion producing network by applying a sample of the received signals to said simulating network and alternately applying a succession of feedback signals to said simulating network, where the succession of feedback signals is produced by delaying the received signals for a plurality of different durations in a like plurality of different paths and then combining the delayed signal from each of the plurality of paths in a succession, according to the duration of the delays, with a signal most recently derived from the simulating network and with the signal that was applied to the simulating network to produce the most recently derived signal. In the foregoing process, the signals are combined in proportions and senses to remove newly produced first-order distortion and the next-to-highest-order distortion present in the signal derived from the simulating network. Signals are delayed in the simulating network and also during combining so that each feedback signal applied to the simulating network participates in the production of the next subsequent feedback signal in the succession.

The invention has the advantage that the original sample and the succession of feedback signals are all applied to the simulating network during one switching cycle at the input and output of the simulating network. The switching functions required iteratively to reduce the distortion in a signal sample are accordingly surprisingly simple.

According to a feature of the invention, a signal sample having reduced distortion is periodically derived from the iterative system simultaneously with the application of a new signal sample to the simulating network. An advantage of this feature is that sampling distortion is minimized for a given total delay in the simulating network, the combining operation and the feedback.

According to another feature of the invention, an operating condition of the simulating network is made responsive to an operating condition of said distortion producing network at such a rate that only negligible change can occur in that operating condition of the simulating network between the application of any two successive signal samples to the simulating network.

This feature provides the advantage that the simulated distortion is the most accurate possible replica of the distortion produced in each sample by the distortion producing network. In the copending application of R. W. Hamming, Ser. No. 418,634, filed Dec. 16, 1964, assigned to the assignee hereof, it is taught that distortion from a remote network can be reduced in spite of variability of an operating condition affecting the original nonlinear distortion by a responsive variation of an operating condition of the simulating network. The last-mentioned feature of the present invention involves the recognition that where the process of reducing distortion is iterative, some limitation must be imposed on the rate of variation of the operating condition of the simulating network. Otherwise, the simulating network would assume during iteration involving one signal sample a number of different operating conditions not representative of the operating condition of the distortion producing network at the time when the original distortion of that signal sample actually occurred.

Other features and advantages of the invention will become apparent from the following detailed description and the drawing, in which the sole figure is a schematic and block diagrammatic illustration of a preferred embodiment of the invention.

In the drawing, a distortion producing repeater 1 is remotely located with respect to the signal recovery circuit 2, being separated therefrom by a transmission medium having an attenuation that is either not accurately known, or that may vary from time to time. For example, repeater 1 may be a submarine cable repeater located at the ocean bottom in a communication line of the type usually designated submarine cable. Connected to the input of repeater 1 is the signal input circuit 3, which may comprise a sending terminal on the shore as well as other repeaters and sections of cable that precede repeater 1. Connected between the output of repeater 1 and the input of signal recovery circuit 2 is the transmission medium, which may include other repeaters and sections of cable that follow repeater 1. The invention may also be used in a radio wave communication system, in which case the transmission medium includes intervening repeaters and the atmospheric or free space transmission path.

Distortion may occur in a submarine cable repeater such as repeater 1 because it must be operated in a way that utilizes nearly all of the power made available to it. The power available for it and the preceding and following repeaters must be applied through the cable itself along with the signal and is limited because the direct current and the direct-current voltage that may be supported by the cable without damage are limited. Because of an increase of signals from source 3 or an aging of the components of repeater 1, overloading of repeater 1 may occasionally occur, thereby producing distortion.

Power level and condition sensors 4 and telemetry modulators 5 are adapted to provide signals that are indicative of the amount of distortion that may be occurring in repeater 1. These circuits may be of the type disclosed and operate in the manner explained in the above-cited copending application of R. W. Hamming for the illustrative sensing of repeater temperature and biases. These signals are transmitted through the transmission medium to the signal recovery circuit 2, and indeed, may utilize one or more of the communication channels available through the submarine cable, in the case of a submarine cable communication system.

In the signal recovery circuit 2, a buffer amplifier 6 receives the distorted signals from the transmission medium and amplifies them to a level sufficiently high that for every level of signal power in repeater 1, as sensed by circuit 4, the output of amplifier 6 must be attenuated to provide signals having the same power level as the signals originally applied to repeater 1. Power level sensor 7, which may be the same as that used at the repeater 1, applies a signal indicative of the output signal power level of amplifier 6 to one input of the comparator and servocontroller 8, comprising a comparator circuit energizing a servomotor in the proportional mode to produce a setting of attenuator 10 that is inversely related to the difference between the comparator inputs; while telemetry demodulator 9, in response to the telemetry signals received from repeater 1 through the transmission medium, applies a signal indicative of the signal power level in remote repeater 1 to the comparator and servocontroller 8. The comparator and servocontroller 8 in turn drives a variable attenuator 10 in a sense such that the transmission medium, buffer amplifier 6 and the variable attenuator 10 provide an overall amplification factor which is the reciprocal of the amplification factor of repeater 1, where the latter factor is a compromise figure fairly representative of repeater 1 in spite of its nonlinear distortion. Thus, the signals applied to duplicate repeater 11 through switching network 12 have substantially the same level as those applied to the remote repeater 1.

Another output of telemetry demodulator 9 is applied to the control apparatus 32, which in turn controls a repeater 11 in response to the telemetered condition of repeater 1 in order to condition repeater 11 to produce distortion simulating the distortion produced by repeater 1. The repeater 11 is a duplicate of the remote repeater 1; and the control apparatus 32 may be, for example, a heating or cooling system for controlling the temperature of repeater 11, assuming that temperature in the condition of repeater 1 that is telemetered. The components and equipment used in this portion of the circuit may be as explained in the above-cited copending application of R. W. Hamming, with the important qualification that the time response characteristics of power level and condition sensor 4 and power level sensor 7 are slow enough that negligible change in the setting of variable attenuator 10 occurs within any one sampling period, which is equal to $N(\tau+\tau_f)$, where N is the number of the delay networks 17–20, $\tau$ is the delay of duplicate repeater 11, and $\tau_f$ the delay of network 24. That is, the time constants of these circuits should be substantially greater than $N(\tau+\tau_f)$.

The remainder of the signal recovery circuit 2 is arranged and adapted in accordance with the invention as follows. The output of variable attenuator 10 is applied to a contact 13 of a switching circuit 12, through which a signal sample will be applied via a switch arm 15 to the input of the duplicate repeater 11 when relay 16, which controls switching circuit 12, is released. The output of variable attenuator 10 is also applied in parallel to the inputs of delay circuits 17–20.

The output signal of duplicate repeater 11 is applied to an attenuator 21 providing an amplification factor that is the reciprocal of the nominal amplification factor of repeater 11, and then to one input of a combining circuit 22. Simultaneously, the input signal of repeater 11 is applied through a delay circuit 23 to a second input of the combining circuit 22 in a sense to provide the difference of the input signals at the output of the summing circuit 22. Combining circuit 22 may be a difference amplifier adapted to provide the difference of its input signals with unity gain. The delay circuit 23 provides a delay, $\tau$, equal to the inherent delay of duplicate repeater 11.

The output of summing circuit 22 is applied through a delay circuit 24, i.e. a delay line having the time delay $\tau_f$, to one input of a combining circuit 25. The delayed outputs of delay circuits 17–20 are applied in succession to another input of combining circuit 25 in a sense such that combining circuit 25 provides the difference of its input signals with unity gain. Combining circuit 25 may be a differential amplifier similar to combining circuit 22. The delays of delay circuits 17–20 are successive integral multiples of the sum of the inherent delay of the duplicate repeater 11 and the delay, $\tau_f$, of delay circuit 24.

The output of combining circuit 25 is applied to switch arm 26, which is closed to contact 27 when relay 16 is released and opened when relay 16 is operated. The output of combining circuits 25 is also applied to contact 14 of switching circuit 12, from which it is applied through switch arm 15 to the input of repeater 11 whenever relay 16 is operated.

The winding of relay 16 is connected to a first output of a driving circuit 28, which applies a voltage as shown in curve 29 to the winding of relay 16. This voltage allows relay 16 to be released for an interval equal to the sum of the inherent delay, $\tau$, of duplicate repeater 11 and the delay, $\tau_f$, of delay circuit 24 and to be operated for an interval $(N-1)$ times as long as the released interval, where N is the total number of iterations provided by recovery circuit 2 and also is the total number of the delay circuits of which 17 through 20 are representative. It is understood that there may be additional delay circuits each providing a delay that is a different multiple of the delay of circuit 17.

Driving circuit 28 preferably comprises a pair of synchronized astable multivibrators, each adapted to remain in one of its states longer than the other stable state. The multivibrator producing the waveform shown in curve 30 operates at N times the frequency of the multivibrator producing the waveform shown in curve 29.

The outputs of delay circuits 17–20 are applied, for example, to corresponding stationary taps 37–40 of a rotary stepping switch 36, according to the illustrative embodiment of the invention. A rotatable central wafer of a stepping switch 36 bears a wiper arm 34 which contacts each of the fixed taps 37–40 in succession as the stepping switch solenoid 33 steps the stepping switch 36 in response to pulses from a second output of driving circuit 28. These pulses occur periodically at a frequency equal to the reciprocal of $\tau+\tau_f$, as shown in curve 30. It is noted that the taps may be arranged, so that wiper arm will contact tap 37 upon the next pulse after contacting tap 40. The pulses applied to the solenoid 33 may therefore be continuous, as shown in curve 30.

In the operation of the signal recovery circuit 2, the distorted received signals pass through buffer amplifier 6 and variable attenuator 10; and at the output of the latter they have substantially the same level as at the output of signal input 3 preceding the remote repeater 1 in which the distortion originally occurred. The operation of power level sensor 7, demodulator 9, and comparator and servocontroller 8 in achieving this signal level at the output of attenuator 10 is explained hereinbefore. At the start (time=0) of the first sampling interval, which is indicated as $\tau+\tau_f$ in curve 29, relay 16 is released; and the signal sample is applied to duplicate repeater 11, in which it is amplified in the same distortion producing manner and with the same inherent delay, $\tau$, as in the remote repeater 1. As disclosed in the copending application of J. D. Rinehart, Ser. No. 427,057, filed Jan. 21, 1965, and assigned to the assignee hereof, for relatively small amounts of distortion in relation to the linear signal component, the result of the redistorting process will be substantially to double the first-order distortion component (distortion produced by amplification of the linear signal component) in relation to the linear signal component and to produce a second-order distortion component (distortion produced by amplification of the original distortion) that is much smaller than the first-order distortion component. The redistorted signal sample then passes through attenuator 21 in which it is returned to the level of the signal sample applied to duplicate repeater 11. The signal sample as originally distorted passes through delay network 23 to arrive at combining circuit 22 simultaneously with the redistorted signal sample. Combining circuit 22 produces an output that is the difference between the signal sample applied to duplicate repeater 11 and the redistorted signal sample issuing from repeater 11. This output is substantially equal to the sum of the first-order distortion present in the once-distorted signal and the second-order distortion present in the redistorted signal.

This output of combining circuit 22 is delayed for an interval $\tau_f$ by the delay network 24. The significance of the delay $\tau_f$ is that it establishes appropriate timing of the recovery circuit 2 for a desired sampling frequency, $F_s$, where $$F_s=\frac{1}{N(\tau+\tau_f)}$$

cycles per second. The sampling frequency, $F_s$, in turn is chosen to satisfy the Nyquist criterion that it be at least twice the highest output frequency which is to be faithfully reproduced, since it is desired to avoid sampling distortion. Of course, $F_s$ cannot be greater than the value $1/N\tau$, for which $\tau_f=0$. In this case, the sampling rate is limited by the inherent delay of the duplicate repeater 11.

At time=0, the once-distorted signal sample was also applied to delay networks 17 through 20 in parallel. As the output signal of circuit 22 is applied to one input of combining circuit 25, the once-distorted signal starts to emerge from delay network 17. At this moment, wiper arm has just completed moving from tap 40 to tap 37, so that the once-distorted signal sample is applied to the other input of combining circuit 25. In combining circuit 25, the output is the difference between the first and second-order distortions from combining circuit 22, on the one hand, and the delayed once-distorted signal from delay network 17, on the other hand. This output comprises the linear signal components, substantially no first-order distortion and some second-order distortion.

Since relay 16 is still operated, contacts 26 and 27 are open; and the processed signal sample having no first-order distortion is applied through the closed contacts 14 and 15 to the input of duplicate repeater 11. $\tau$ seconds later, wiper arm 34 moves from tap 37 to tap 38. At the same time, a further redistorted sample emerges from attenuator 21 having newly produced first-order distortion, the applied second-order distortion, and a third-order distortion that is the result of redistortion of the second-order distortion. Combining circuit 22 produces the difference between this redistorted signal sample and the appropriately delayed previously processed sample that has second-order distortion but no first-order distortion to yield an output consisting of the first-order distortion and the third-order distortions. It is noted that second-order distortion, which was previously the highest order of distortion plays no further role. Combining circuit 25 produces an output that is the difference between these distortions, on the one hand, and the once-distorted signal from delay network 18, on the other hand. This output has only third-order distortion. The processes described above are again repeated; and, $\tau$ seconds later, as wiper arm 34 has moved to tap 39, the signal emerging from circuit 25 has only fourth-order distortion. The third-order distortion was eliminated in circuit 22 in this iteration and plays no further role in the process.

Relay 16 remains released until just before wiper arm moves to tap 40, upon which the delayed signal from the $N^{th}$ delay network 20 is ready to appear. A total time of $\tau_N$ seconds has passed since time=0. Relay 16 releases to admit a new sample to duplicate repeater 11 and simultaneously to admit to the output through contacts 26 and 27 a processed signal sample having $(N+1)^{th}$ order distortion. This signal is the result of subtracting the present output of delay network 24 from the output of the delay network 20. In analogy to the iterations described above the $N^{th}$ order distortion is removed by the subtraction in circuit 22 and plays no further role in the process, and the first-order distortion that was newly produced by the last passage through duplicate repeater 11 is removed by the subtraction in network 25. It may be noted that each iteration necessarily involves the temporary presence of first-order distortion; but, once a higher order of distortion is removed that order does not reappear.

It is further noted that the improved signal sample appearing at contact 27 remains distinct and separate from the new signal sample being admitted to duplicate repeater 11 because of the inherent delay of repeater 11 and the delay of network 24.

Various modifications of the invention can be made. For example, high speed electronic switching devices can be substituted for relay 16 and rotary stepping switch 36. It is possible to reverse the order of signal processing in that the removal of the newly produced first-order distortion, as represented by combining circuit 25, may be done first; and then the higher-order distortion produced by the passage through repeater 11 preceding the most recent passage may be removed, as represented by combining circuit 22.

It is also possible to combine additively the result of a previous iteration, appropriately delayed, and the delayed once-distorted signal at wiper arm 34 and then combine this sum and the most recently produced redistorted signal as it emerges from attenuator 21 to obtain the difference between them.

What is claimed is:

1. A system for reducing distortion in signals received from a distortion producing network, comprising a network simulating said distortion producing network, switching means for alternately applying a sample of said received signals to said simulating network and a succession of feedback signals to said simulating network, a plurality of means for delaying said received signals, means for producing said feedback signals comprising means for combining a signal from each of said delaying means in succession with a signal derived from said simulating network and with a signal previously applied to said simulating network in proportions and senses to remove from said feedback signal the newly produced first-order distortion and the next-to-highest-order distortion present in said signal derived from said simulating network, and means for periodically abstracting a signal from said combining means.

2. A system for reducing distortion in signals received from a distortion producing network, comprising a network simulating said distortion producing network, first switching means for applying a sample of said signals to said simulating network, second switching means operable in alternation with said first switching means for applying a feedback signal to said simulating network, a plurality of means for delaying said signals as received from said distortion producing network, means for producing said feedback signal comprising means for combining a signal from each of said delaying means in succession with a signal derived from said simulating network and with a signal previously applied to said simulating network in proportions and senses to remove from said feedback signal newly produced first-order distortion and the next-to-highest-order distortion present in said signal derived from said simulating network, and means for periodically abstracting a signal from said combining means.

3. A system according to claim 2 in which the means for periodically abstracting a signal from the combining means comprises switching means operable simultaneously with the first switching means.

4. A system according to claim 2 in which the simulating network comprises a duplicate of the distortion producing network and means responsive to an operating condition of said distortion producing network for producing an equivalent operating condition of said duplicate network, said responsive means having a time constant that is substantially longer than a period of alternation of said first and second switching means, whereby said equivalent operating condition remains substantially constant between any two signal samples applied in succession to the simulating network by said first switching means.

5. A system for reducing distortion in signals received from a distortion producing network, comprising a network simulating said distortion producing network, first switching means for applying a sample of said signals to said simulating network, first means for combining input and output signals of said simulating network, a plurality of means for delaying said signals as received from said distortion producing network, second means for combining signals from each of said plurality of delaying means in succession with signals from said first combining means, second switching means operable in alternation with said first switching means for applying signals from said second combining means to said simulating network, and means for periodically abstracting signals from said second combining means.

6. A system for reducing distortion in signals received from a distortion producing network, comprising a duplicate of said distortion producing network, first switching means for applying a sample of said signals to said duplicate network, second switching means operable in alternation with said first switching means for applying a feedback signal to said duplicate network, a plurality of means for delaying signals as received from said distortion producing network, said plurality of delaying means having delays that are successive integral multiples of the smallest of said delays, a stepping switch arrangement for receiving signals from said plurality of delaying means in a succession according to said integral multiples of delay, means for producing said feedback signal comprising means for combining a signal from said stepping switch arrangement with a signal derived from said duplicate network and with the signal that was applied to said duplicate network next preceding the currently produced feedback signal in proportions and senses to remove from said feedback signal the newly produced first-order distortion and the next-to-highest-order distortion present in said signal derived from said duplicate network, said second switching means remaining operated as said stepping switch arrangement successively receives signals from said plurality of delaying means, and means for abstracting a signal from said combining means simultaneously with reoperation of said first switching means.

No references cited.

ARTHUR GAUSS, *Primary Examiner.*

DAVID J. GALVIN, *Examiner.*

J. JORDAN, *Assistant Examiner.*